United States Patent
Park et al.

(10) Patent No.: US 10,953,925 B2
(45) Date of Patent: Mar. 23, 2021

(54) FRONT BODY STRUCTURE OF VEHICLE

(71) Applicants: Hyundai Motor Company, Seoul (KR); Kia Motors Corporation, Seoul (KR)

(72) Inventors: Ji Woong Park, Hwaseong-si (KR); Yun Suk Hong, Seoul (KR); Hee Sang Kwon, Seongnam-si (KR); Il Sang Kim, Hwaseong-si (KR); Kwan Ho Moh, Gunpo-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 101 days.

(21) Appl. No.: 16/539,331

(22) Filed: Aug. 13, 2019

(65) Prior Publication Data

US 2020/0307701 A1    Oct. 1, 2020

(30) Foreign Application Priority Data

Mar. 25, 2019    (KR) .......................... 10-2019-0033934

(51) Int. Cl.
  *B62D 21/15*    (2006.01)
  *B62D 25/08*    (2006.01)
  *B62D 21/02*    (2006.01)
  *B62D 21/11*    (2006.01)

(52) U.S. Cl.
  CPC .......... *B62D 21/152* (2013.01); *B62D 21/02* (2013.01); *B62D 21/11* (2013.01); *B62D 25/081* (2013.01); *B62D 25/082* (2013.01); *B62D 25/085* (2013.01); *B62D 25/088* (2013.01)

(58) Field of Classification Search
  CPC .... B62D 21/152; B62D 25/08; B62D 25/081; B62D 25/082; B62D 25/085; B62D 25/088; B62D 25/12
  USPC .................. 296/187.09, 203.02, 193.09, 192
  See application file for complete search history.

(56) References Cited

U.S. PATENT DOCUMENTS

| | | | | |
|---|---|---|---|---|
| 4,264,101 A | * | 4/1981 | Gotoh .................... | B62D 25/16 296/203.02 |
| 4,883,309 A | * | 11/1989 | Miyazaki ............. | B62D 25/081 296/193.09 |
| 4,950,024 A | * | 8/1990 | Watari .................... | B60K 37/00 296/192 |
| 5,052,742 A | * | 10/1991 | Akoshima ............ | B62D 25/081 296/192 |

(Continued)

FOREIGN PATENT DOCUMENTS

JP         4-254264     *  9/1992  .......... B62D 25/082
KR    10-2016-0141216 A    12/2016

*Primary Examiner* — Gregory A Blankenship
(74) *Attorney, Agent, or Firm* — Morgan, Lewis & Bockius LLP

(57) ABSTRACT

A front body structure of a vehicle may be configured such that a cowl cross member connecting shock absorber mounting portions to each other includes a cowl cross member lower portion, a cowl cross member upper extension portion, and a cowl cross member upper portion, wherein the cowl cross member is provided with two first closed space and second closed space that are defined by the cowl cross member upper extension portion to be isolated from each other, and the cowl cross member is connected to a fender apron upper member and a cowl panel through a hood hinge mounting bracket.

8 Claims, 5 Drawing Sheets

(56) References Cited

U.S. PATENT DOCUMENTS

| | | | | |
|---|---|---|---|---|
| 5,269,583 | A * | 12/1993 | Maeda | B62D 25/082 296/187.09 |
| 6,209,950 | B1 * | 4/2001 | Hanyu | B62D 25/04 296/203.02 |
| 6,633,089 | B2 * | 10/2003 | Kimura | B60R 16/0215 174/72 A |
| 2007/0215402 | A1 * | 9/2007 | Sasaki | B62D 25/088 180/232 |
| 2007/0246971 | A1 * | 10/2007 | Hanakawa | B62D 25/081 296/203.01 |
| 2010/0270829 | A1 * | 10/2010 | Furumoto | B62D 21/15 296/193.11 |
| 2014/0292028 | A1 * | 10/2014 | Dix | B62D 21/152 296/187.1 |
| 2015/0015030 | A1 * | 1/2015 | Sasaki | B62D 25/088 296/192 |
| 2016/0031485 | A1 * | 2/2016 | Nakauchi | B62D 25/085 296/203.02 |
| 2016/0090126 | A1 * | 3/2016 | Min | B62D 25/081 296/187.09 |
| 2016/0288839 | A1 * | 10/2016 | Fukuoka | B62D 25/082 |
| 2017/0036643 | A1 * | 2/2017 | Matsushima | B62D 25/10 |
| 2017/0203794 | A1 * | 7/2017 | Nakamura | B62D 25/04 |
| 2018/0170434 | A1 * | 6/2018 | Saito | B62D 25/088 |
| 2018/0354559 | A1 * | 12/2018 | Nakauchi | B62D 25/082 |
| 2019/0210653 | A1 * | 7/2019 | Bokeloh | B62D 25/02 |
| 2020/0114976 | A1 * | 4/2020 | Matsuoka | B62D 25/14 |
| 2020/0122779 | A1 * | 4/2020 | Kim | B62D 25/088 |
| 2020/0180700 | A1 * | 6/2020 | Kim | B62D 25/088 |
| 2020/0307695 | A1 * | 10/2020 | Tanaka | B62D 25/20 |
| 2020/0307701 | A1 * | 10/2020 | Park | B62D 21/02 |
| 2020/0307710 | A1 * | 10/2020 | Miyanaga | B62D 25/081 |

* cited by examiner

FRONT BODY STRUCTURE OF VEHICLE

CROSS REFERENCE TO RELATED APPLICATION

The present application claims priority to Korean Patent Application No. 10-2019-0033934, filed Mar. 25, 2019, the entire contents of which is incorporated herein for all purposes by this reference.

BACKGROUND OF THE INVENTION

Field of the Invention

The present invention relates to a front body structure of a vehicle. More particularly, the present invention relates to a front body structure of a vehicle, the front body structure being capable of reducing passenger injuries by effectively dispersing a collision load, while ensuring a rigid supporting structure against a vehicle collision.

Description of Related Art

A battery mounted in an engine compartment of a vehicle is typically mounted at a rear position (a position close to a cowl panel) facing a passenger compartment such that the long side of the battery extends in a longitudinal direction of the vehicle. Such a structure is advantageous in terms of improvement of design profile and weight distribution.

However, in the case of the structure in which the battery is mounted at the rear position of the engine compartment in the longitudinal direction of the vehicle as described above, when a vehicle collision occurs, a vehicle body and vehicle components (brake booster and the like) may be excessively pushed toward the passenger compartment due to a rearward movement of the battery, causing severe passenger injuries.

When a brake booster is excessively pushed toward the passenger compartment, there is a high possibility of injury to a passenger's lower body due to a pedal. In an effort to minimize such undesirable movement of pedal being pushed, there has been developed a structure in which a pedal stopper mechanism is additionally provided in the passenger compartment. However, in the instant case, there is a problem that weight increase may be caused due to an increase in vehicle components, fuel mileage may deteriorate, and costs may greatly increase.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a front body structure of a vehicle, the front body structure being configured for effectively dispersing a collision load while ensuring a rigid supporting structure against a vehicle collision in a structure in which a battery is mounted at a rear position of an engine compartment in a longitudinal direction of the vehicle, such that a passenger injury is minimized.

In various aspects of the present invention, there is provided a front body structure of a vehicle, the front body structure including: a cowl cross member mounted in a transverse direction of a vehicle body and coupled to a shock absorber mounting portion at each side of the cowl cross member, wherein the cowl cross member includes a first closed space and a second closed space that are isolated from each other; and a hood hinge mounting bracket coupled to the shock absorber mounting portion in a state of being coupled to the cowl cross member in a direction toward an engine compartment, in a state of being coupled to a fender apron upper member in the transverse direction of the vehicle body, and in a state of being coupled to a cowl panel in a direction toward a passenger compartment.

The cowl cross member may include: a cowl cross member lower portion provided to connect two shock absorber mounting portions respectively located at left and right sides of the vehicle to each other; a pair of cowl cross member upper extension portions provided at opposite sides of the cowl cross member lower portion, to be connected to the first and second shock absorber mounting portions respectively, wherein each of the cowl cross member upper extension portions forms the isolated first closed space between each of the opposite sides of the cowl cross member lower portion and each of the first and second shock absorber mounting portions; and a cowl cross member upper portion coupled to the cowl cross member lower portion in a state of connecting the pair of cowl cross member upper extension portions to each other, and forming the isolated second closed space between the cowl cross member lower portion and the cowl cross member upper extension portions.

The first closed spaces and the second closed space of the cowl cross member may be isolated from each other by partition walls that extend from the cowl cross member upper extension portions and are coupled to the cowl cross member lower portion.

A battery may be provided at a rear position of the engine compartment to face the first closed spaces in a longitudinal direction of the vehicle body.

Each of the shock absorber mounting portions may include: a shock absorber housing to which an upper end portion of a shock absorber is configured to be coupled; and a shock absorber housing cover coupled to the shock absorber housing, wherein a side of a corresponding one of the cowl cross member upper extension portions may be connected to the shock absorber housing cover.

The hood hinge mounting bracket may include: a center portion coupled to the shock absorber housing cover; a first side portion coupled to a corresponding cowl cross member upper extension portion of the first and second cowl cross member upper extension portions; a second side portion coupled to the fender apron upper member; and a rear extension portion coupled to the cowl panel, wherein the cowl cross member upper portion and the first side portion of the hood hinge mounting bracket may be connected to each other in a state of being overlapped and coupled to a corresponding cowl cross member upper extension portion of the first and second the cowl cross member upper extension portions.

When a collision load is generated at a position of the cowl cross member upper extension portion, the collision load may be dispersed over the hood hinge mounting bracket through a first path connecting the first side portion and the rear extension portion to each other, through a second path connecting the first side portion, the center portion, the second side portion, and the fender apron upper member to each other, and through a third path connecting the second side portion, the rear extension portion, and the cowl panel to each other.

The front body structure of a vehicle according to an exemplary embodiment of the present invention is a structure being configured for minimizing collapse of the first and second closed spaces upon a vehicle collision by a strong supporting force of the cowl cross member upper extension portions that form the first and second closed spaces. This makes it possible to minimize undesirable movement of vehicle components of the engine compartment including the vehicle body that are pushed toward a passenger compartment upon a vehicle collision, thus minimizing passenger injuries.

Furthermore, the front body structure of a vehicle according to an exemplary embodiment of the present invention is a structure being configured for effectively transmitting collision energy, which is generated due to undesirable movement of the battery that is pushed rearward upon a vehicle collision, to the fender apron upper member and the cowl panel through the cowl cross member and the hood hinge mounting bracket. This makes it possible effectively disperse collision energy, thus minimizing deformation of the vehicle body forming the engine compartment and minimizing passenger injuries.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
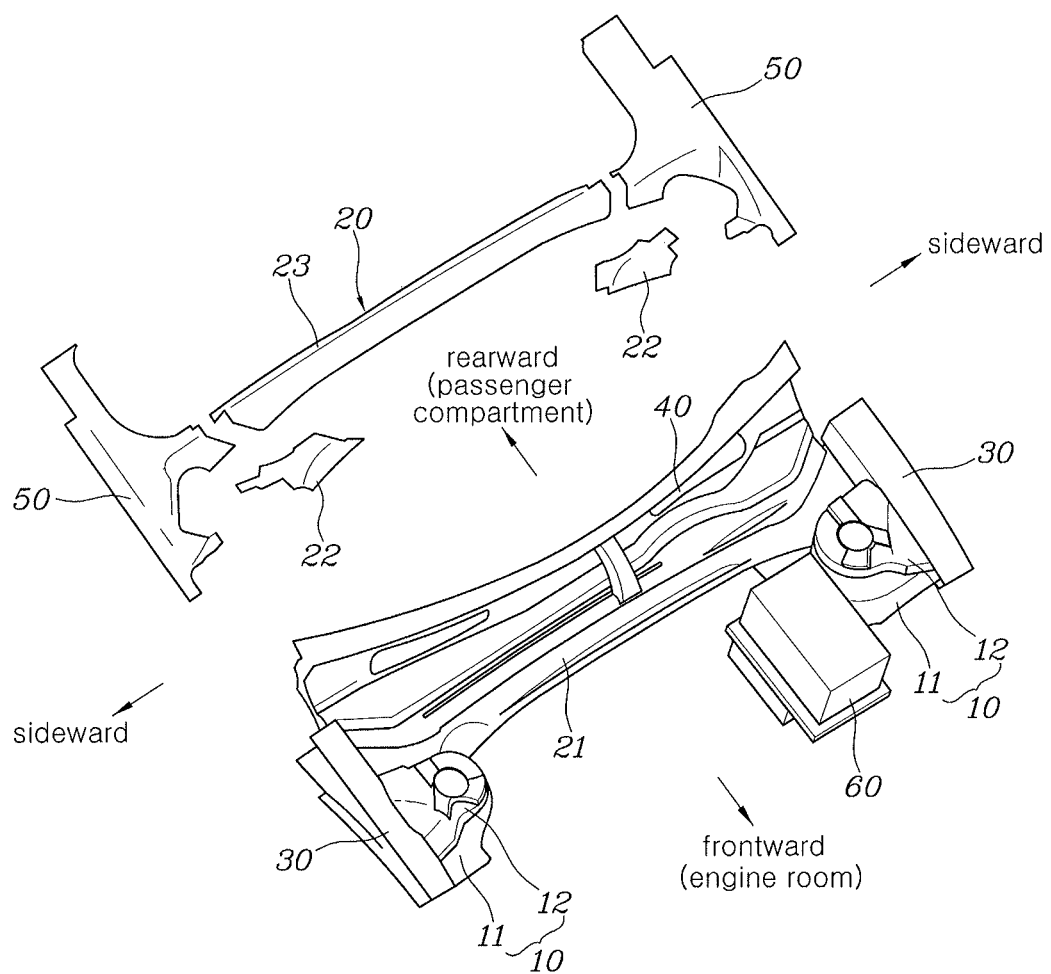
FIG. 1 is an exploded perspective view showing components forming a front body structure of a vehicle according to an exemplary embodiment of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinbelow, an exemplary embodiment of the present invention will be described in detail with reference to the accompanying drawings. Throughout the drawings, the same reference numerals will refer to the same or like parts.

Figure 2:
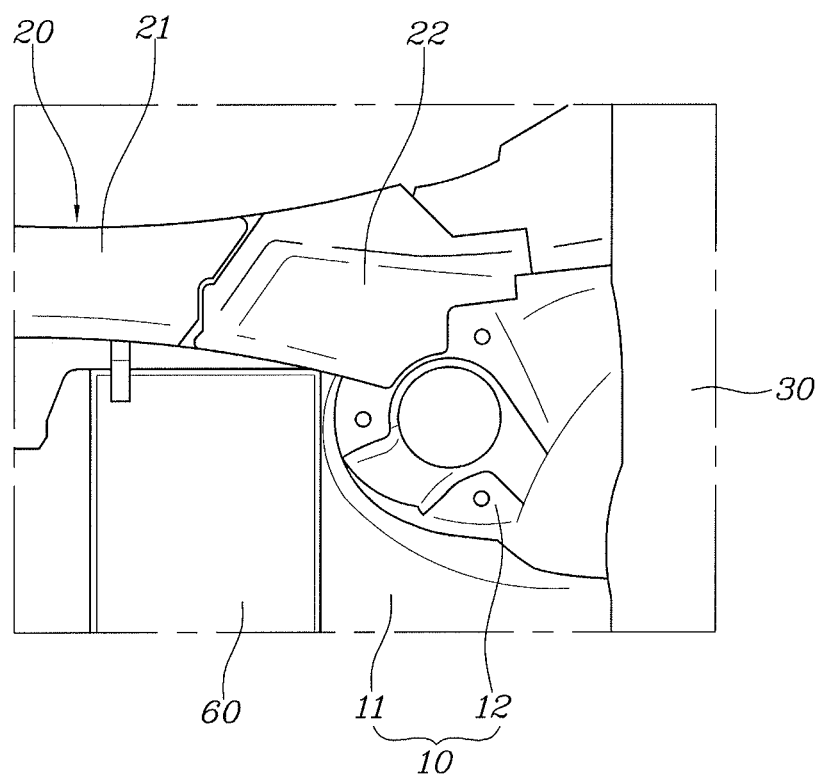
FIG. 2 is a view showing a state in which a cowl cross member upper extension is coupled to a cowl cross member lower portion and a shock absorber mounting portion in FIG. 1.
Figure 3:
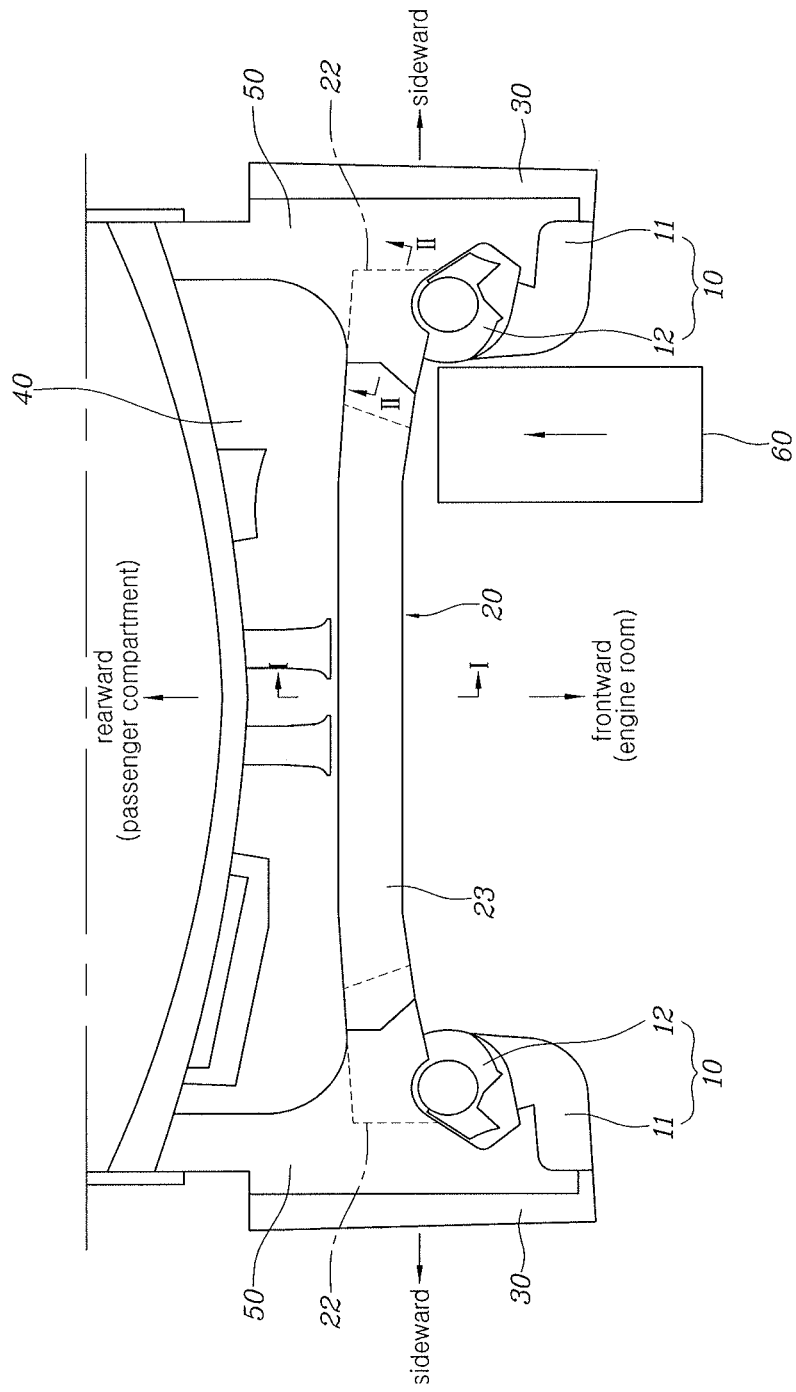
FIG. 3 is a plan view showing a state in which the components of FIG. 1. are mounted.
Figure 4:
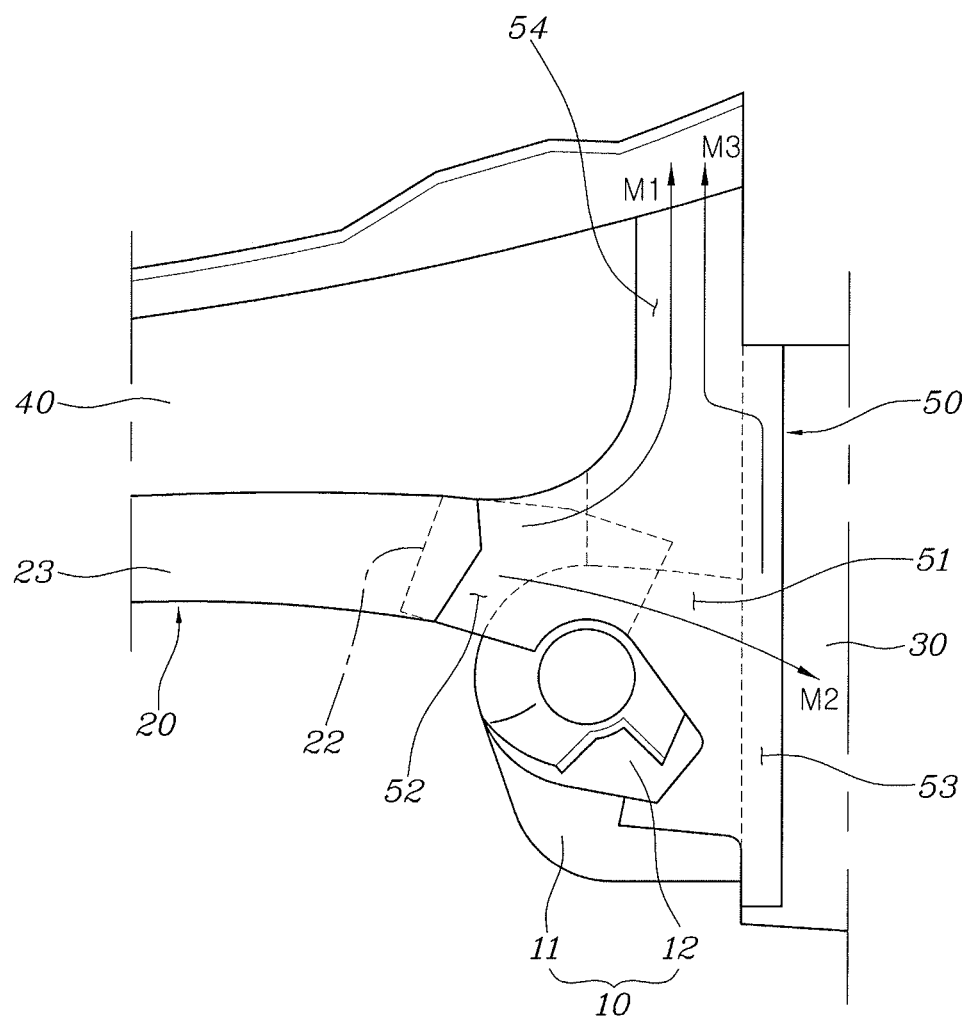
FIG. 4 is an enlarged view showing a portion where a hood hinge mounting bracket is mounted in FIG. 3.
Figure 5:
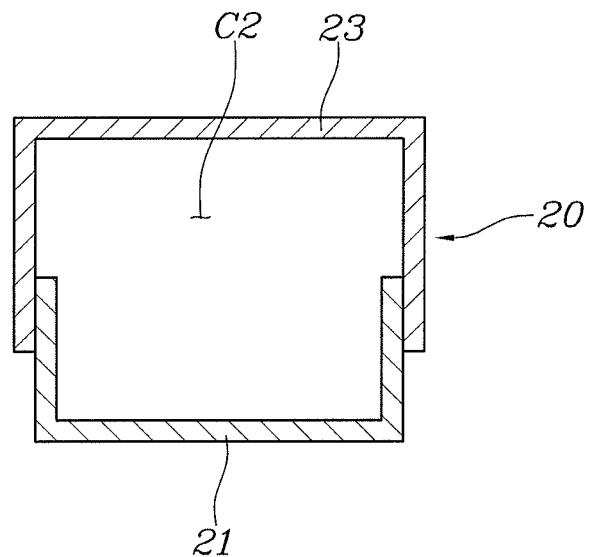
FIG. 5 and FIG. 6 are sectional views taken along line I-I and line II-II in FIG. 3, respectively.
Figure 6:
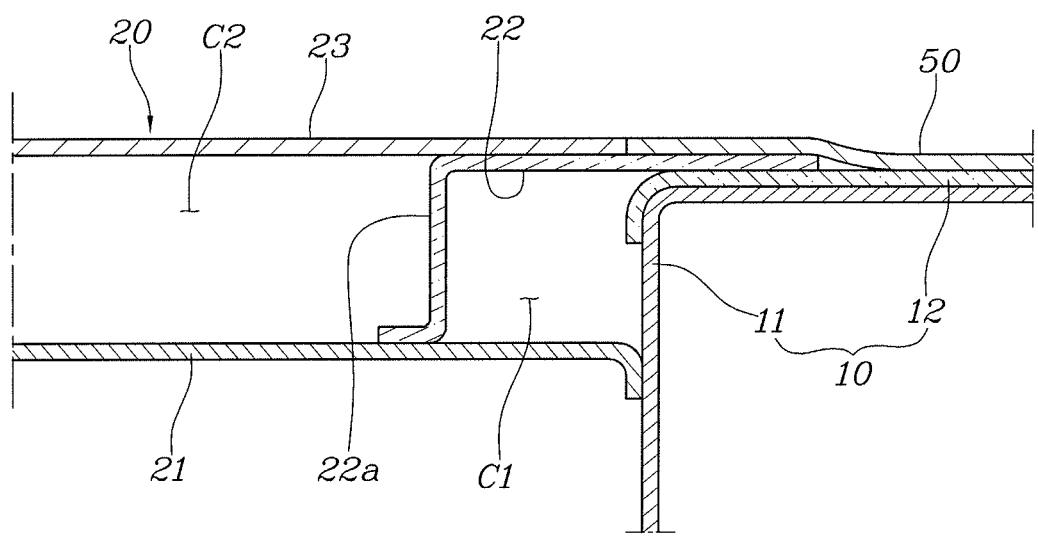

As shown in FIGS. 1 to 6, a front body structure of a vehicle according to an exemplary embodiment of the present invention may include a cowl cross member 20 mounted in a transverse direction of a vehicle body and coupled to a shock absorber mounting portion 10 at each side thereof, the cowl cross member having a first closed space C1 and a second closed space C2 that are defined therein to be isolated from each other; and a hood hinge mounting bracket 50 coupled to the shock absorber mounting portion 10 in a state of being coupled to the cowl cross member 20 in a direction toward an engine compartment, in a state of being coupled to a fender apron upper member 30 in a sideward direction thereof, and in a state of being coupled to a cowl panel 40 in a direction toward a passenger compartment.

The shock absorber mounting portion 10 is a portion to which an upper end portion of a shock absorber is fixedly coupled. Two shock absorber mounting portions 10 are provided in an engine compartment at respective locations on right and left sides of a vehicle. In detail, each of the shock absorber mounting portions 10 includes a shock absorber housing 11 to which the upper end portion of the shock absorber is coupled, and a shock absorber housing cover 12 coupled to the shock absorber housing 11 in an overlapping manner.

The cowl cross member 20 includes a cowl cross member lower portion 21 provided to connect the two shock absorber mounting portions 10 respectively located at the left and right sides of the vehicle to each other; a pair of cowl cross member upper extension portions 22 provided at opposite sides of the cowl cross member lower portion 21, respectively to be connected to the shock absorber mounting portions 10, wherein each of the cowl cross member upper extension portions forms the isolated first closed space C1 between each of the opposite sides of the cowl cross member lower portion 21 and each of the shock absorber mounting portions 10; and a cowl cross member upper portion 23 coupled to the cowl cross member lower portion 21 in a state of connecting the pair of cowl cross member upper extension portions 22 to each other, and forming the isolated second closed space C2 between the cowl cross member lower portion 21 and the cowl cross member upper extension portions 22.

The first closed spaces C1 and the second closed space C2 of the cowl cross member 20 are isolated from each other by partition walls 22a. Each of the partition walls 22a extends from each of the cowl cross member upper extension portions 22 and is coupled to the cowl cross member lower portion 21.

In a general front body structure according to the related art, a cowl cross member is simply constituted by a combination of a cowl cross member lower portion and a cowl cross member upper portion. Because of this, only a single chamber is formed in the cowl cross member. This causes a problem in that the single chamber may easily collapse due to a collision load which is generated upon a vehicle collision, thus securing a rigid supporting structure is difficult. As a result, vehicle components of the engine compartment including a vehicle body may be excessively pushed toward a passenger compartment, causing severe passenger injuries.

However, in the exemplary embodiment according to an exemplary embodiment of the present invention, due to the fact that an internal space of the cowl cross member 20 is formed as the first closed spaces C1 and the second closed space C2 by the cowl cross member upper extension portions 22, and due to the fact that the partition walls 22a of the cowl cross member upper extension portions 22 can exert a strong supporting force, even when a vehicle collision occurs, the partition walls 22a of the cowl cross member upper extension portions 22 exerting such a supporting force can minimize collapse of the first closed spaces C1 and the second closed space C2. This makes it possible to minimize undesirable movement of vehicle components of the engine compartment including the vehicle body that are pushed toward the passenger compartment upon a vehicle collision, thus minimizing passenger injuries.

Therefore, in the exemplary embodiment of the present invention, a battery 60, which highly tends to be pushed toward the passenger compartment upon a vehicle collision, be mounted at a rear position of the engine compartment to face the partition walls 22a of the cowl cross member upper extension portions 22 exhibiting a strong supporting force and also be mounted in a longitudinal direction of the vehicle body to achieve weight distribution, a design profile for installation space, and the like.

The hood hinge mounting bracket 50 includes a center portion 51 coupled to the shock absorber housing cover 12 in an overlapping manner, a first side portion 52 extending toward the engine compartment and coupled to each of the cowl cross member upper extension portions 22 in an overlapping manner, a second side portion 53 extending in a sideward direction and coupled to the fender apron upper member 30 in an overlapping manner, and a rear extension portion 54 extending rearward and coupled to the cowl panel 40.

The exemplary embodiment of the present invention are directed to providing a structure in which a side of corresponding one of the cowl cross member upper extension portions 22 is connected to the shock absorber housing cover 12. Due to such a structure, when a collision load is transmitted to the cowl cross member upper extension 22, the collision load may be effectively transmitted to the shock absorber housing 11 and to the fender apron upper member 30 connected to the shock absorber housing 11 through the shock absorber housing cover 12.

Furthermore, the exemplary embodiment of the present invention are directed to providing a structure in which an end portion of the cowl cross member upper portion 23 and the first side portion 52 of the hood hinge mounting bracket 50 are connected to each other in a state in which an end portion of the cowl cross member upper portion 23 and the first side portion 52 of the hood hinge mounting bracket 50 are coupled onto the cowl cross member upper portion 22 in an overlapping manner. Due to such a structure, the collision load transmitted to the cowl cross member upper portion 23 may be effectively transmitted to the hood hinge mounting bracket 50.

Furthermore, the exemplary embodiment of the present invention are directed to providing a structure in which even when a vehicle collision occurs and the battery 60 provided in the engine compartment is pushed rearward and thus collides with the cowl cross member 20 where the cowl cross member upper extension portions 22 are located, the cowl cross member 20 having the isolated first and second closed spaces C1 and C2 can exert a strong supporting force. The partition walls 22a of the cowl cross member upper extension portions 22 can exert a strong supporting force to minimize collapse of the first and second closed spaces C1 and C2. This makes it possible to minimize undesirable movement of vehicle components of the engine compartment including the vehicle body that are pushed toward the passenger compartment upon a vehicle collision, thus minimizing passenger injuries.

Furthermore, the exemplary embodiment of the present invention are directed to providing a structure in which when collision energy is generated due to undesirable movement of the battery 60 which is pushed rearward upon a vehicle collision and the collision energy is transmitted to the cowl cross member 20, the collision energy At the instant time may be effectively dispersed over the hood hinge mounting bracket 50 through a first path M1 connecting the first side portion 52 and the rear extension portion 54 to each other, through a second path M2 connecting the first side portion 52, the center portion 51, the second side portion 53, and the fender apron upper member 30 to each other, and through a third path M3 connecting the second side portion 53, the rear extension portion 54, and the cowl panel 40 to each other. This makes it possible to minimize deformation of the vehicle body forming the engine compartment, thus minimizing passenger injuries.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A front body structure of a vehicle, the front body structure comprising:
a cowl cross member mounted in a transverse direction of a vehicle body and coupled to a shock absorber mounting portion at each side of the cowl cross member, wherein the cowl cross member includes a first closed space and a second closed space that are isolated from each other; and
a hood hinge mounting bracket coupled to the shock absorber mounting portion in a state of being coupled to the cowl cross member in a direction toward an engine compartment, in a state of being coupled to a fender apron upper member in the transverse direction of the vehicle body, and in a state of being coupled to a cowl panel in a direction toward a passenger compartment.

2. The front body structure of claim 1, wherein the cowl cross member includes:
- a cowl cross member lower portion provided to connect first and second shock absorber mounting portions of the shock absorber mounting portion, wherein the first and second shock absorber mounting portions are respectively located at left and right sides of the vehicle body in the transverse direction of the vehicle body;
- first and second cowl cross member upper extension portions provided at a first opposite side and a second opposite side of the cowl cross member lower portion, to be connected to the first and second shock absorber mounting portions respectively, wherein each of the first and second cowl cross member upper extension portions forms the first closed space between each of the first opposite side and the second opposite side of the cowl cross member lower portion and each of the first and second shock absorber mounting portions; and
- a cowl cross member upper portion coupled to the cowl cross member lower portion in a state of connecting the first and second cowl cross member upper extension portions to each other, and forming the second closed space between the cowl cross member lower portion and the first and second cowl cross member upper extension portions.

3. The front body structure of claim 2, wherein the first closed space and the second closed space of the cowl cross member are isolated from each other by partition walls that extend from the first and second cowl cross member upper extension portions and are coupled to the cowl cross member lower portion.

4. The front body structure of claim 2, wherein a battery is provided at a rear position of the engine compartment to face the first closed space in a longitudinal direction of the vehicle body.

5. The front body structure of claim 2, wherein each of the first and second shock absorber mounting portions includes:
- a shock absorber housing to which an upper end portion of a shock absorber is configured to be coupled; and
- a shock absorber housing cover coupled to the shock absorber housing, wherein a side of a corresponding one of the first and second cowl cross member upper extension portions is connected to a corresponding shock absorber housing cover.

6. The front body structure of claim 5, wherein the hood hinge mounting bracket includes:
- a center portion coupled to the shock absorber housing cover;
- a first side portion coupled to a corresponding cowl cross member upper extension portion of the first and second cowl cross member upper extension portions ;
- a second side portion coupled to the fender apron upper member; and
- a rear extension portion coupled to the cowl panel, wherein the cowl cross member upper portion and the first side portion of the hood hinge mounting bracket are connected to each other in a state of being overlapped and coupled to a corresponding cowl cross member upper extension portion of the first and second the cowl cross member upper extension portions.

7. The front body structure of claim 6,
wherein when a collision load is generated at a position of the first and second cowl cross member upper extension portions, the collision load is dispersed over the hood hinge mounting bracket through a first path connecting the first side portion and the rear extension portion to each other, through a second path connecting the first side portion, the center portion, the second side portion, and the fender apron upper member to each other, and through a third path connecting the second side portion, the rear extension portion, and the cowl panel to each other.

8. The front body structure of claim 5,
wherein a first end of the shock absorber housing cover is coupled to the shock absorber housing between the shock absorber housing and the hood hinge mounting bracket, and
wherein a second end of the shock absorber housing cover is coupled to the shock absorber housing in the first closed space.

* * * * *